(12) United States Patent
Dutta et al.

(10) Patent No.: US 11,119,900 B2
(45) Date of Patent: *Sep. 14, 2021

(54) MODULAR TESTING KIT AND TESTING FRAMEWORK FOR TESTING A HUMAN MACHINE INTERFACE (HMI) APPLICATION

(71) Applicant: Wipro Limited, Bangalore (IN)

(72) Inventors: Souvik Dutta, West Bengal (IN); Debasish Chanda, West Bengal (IN); Swarup Mandal, West Bengal (IN)

(73) Assignee: Wipro Limited, Bangalore (IN)

( * ) Notice: Subject to any disclaimer, the term of this patent is extended or adjusted under 35 U.S.C. 154(b) by 336 days.

This patent is subject to a terminal disclaimer.

(21) Appl. No.: 15/937,509

(22) Filed: Mar. 27, 2018

(65) Prior Publication Data

US 2019/0294530 A1 Sep. 26, 2019

(30) Foreign Application Priority Data

Mar. 21, 2018 (IN) .............................. 201841010434

(51) Int. Cl.
*G06F 11/36* (2006.01)

(52) U.S. Cl.
CPC ...... *G06F 11/3684* (2013.01); *G06F 11/3688* (2013.01); *G06F 11/3692* (2013.01)

(58) Field of Classification Search
CPC ............. G06F 11/3684; G06F 11/3688; G06F 11/3664; G06F 11/3672; G06F 11/3692
See application file for complete search history.

(56) References Cited

U.S. PATENT DOCUMENTS

| 7,316,004 | B2 * | 1/2008 | Sluiman | G06F 11/3684 714/E11.208 |
| 8,856,594 | B2 * | 10/2014 | Kurapati | G06F 11/3664 714/27 |
| 2008/0240369 | A1 * | 10/2008 | Allen | H04M 3/28 379/27.04 |

(Continued)

FOREIGN PATENT DOCUMENTS

CN 206540976 U 10/2017

OTHER PUBLICATIONS

Stolle et al., "Challenges in Automated Model-Based HMI Testing," Conference: INFORMATIK 2005, pp. 186-190 (2005).

(Continued)

*Primary Examiner* — Jigar P Patel
(74) *Attorney, Agent, or Firm* — Finnegan, Henderson, Farabow, Garrett & Dunner, LLP

(57) ABSTRACT

This disclosure relates generally to a human machine interface (HMI) application, and more particularly to modular testing kits and testing framework for testing the HMI application. In one embodiment, a method for developing a modular testing kit for testing a modular component of the HMI application is disclosed. The method may include generating a plurality of test cases for testing the modular component based on a definition of each of a set of interfaces configured to implement the modular component on a target platform, developing the modular testing kit to execute the plurality of test cases by simulating each of the set of interfaces, and creating a test script for each of the plurality of test cases using the modular testing kit.

18 Claims, 8 Drawing Sheets

(56) References Cited

U.S. PATENT DOCUMENTS

| | | | | |
|---|---|---|---|---|
| 2012/0259576 A1* | 10/2012 | Thulasidasan | ...... | G06F 11/3684 702/123 |
| 2013/0104106 A1* | 4/2013 | Brown | ................ | G06F 11/3696 717/124 |
| 2014/0303756 A1 | 10/2014 | Tarnutzer et al. | | |
| 2015/0254171 A1* | 9/2015 | Harden | ............... | G06F 11/3684 717/124 |
| 2017/0139811 A1* | 5/2017 | Kuo | ................... | G06F 11/3664 |
| 2017/0315905 A1* | 11/2017 | Choudhury | ......... | G06F 11/3684 |
| 2018/0067845 A1* | 3/2018 | Costello, Jr. | ........ | G06F 11/3688 |

OTHER PUBLICATIONS

"Discover Altran: World leader in engineering solutions and R&D", retrieved from internet: https//www.altran.com/us/en (2018).

* cited by examiner

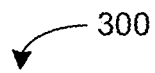

| State Name | <State Name> | | |
|---|---|---|---|
| State Function | | | |
| Type | Name | Parameter | |
| Entry | <Entry Func> | <Param1>:<Value1>; <Param2>:<Value2> | |
| Do | <Do Func> | <Param1>:<Value1>; <Param2>:<Value2> | |
| Exit | <Exit Func> | <Param1>:<Value1>; <Param2>:<Value2> | |
| Transition | | | |
| Trigger1 | <Guard11> | <Action11> | <Next State> |
| | <Guard12> | <Action12> | <Next State> |
| | ? | ? | ? |
| | <Guard1N> | <Action1N> | <Next State> |
| Trigger2 | <Guard21> | <Action21> | <Next State> |
| | <Guard22> | <Action22> | <Next State> |
| | ? | ? | ? |
| | <Guard2N> | <Action2N> | <Next State> |
| ? | ? | ? | ? |
| TriggerM | <GuardM1> | <ActionM1> | <Next State> |
| | <GuardM2> | <ActionM2> | <Next State> |
| | ? | ? | ? |
| | <GuardMN> | <ActionMN> | <Next State> |

FIG. 3

MODULAR TESTING KIT AND TESTING FRAMEWORK FOR TESTING A HUMAN MACHINE INTERFACE (HMI) APPLICATION

This application claims the benefit of Indian Patent Application Serial No. 201841010434 filed Mar. 21, 2018, which is hereby incorporated by reference in its entirety.

FIELD

This disclosure relates generally to a human machine interface (HMI) application, and more particularly to method and system for modular testing kits and testing framework for testing the HMI application.

BACKGROUND

HMI applications may allow a user to interact with a computing system for performing various tasks. Examples of the HMI application may include, but are not limited to, industrial machine controller, in-vehicle onboard device interface, web-based HMI server, marine control system, and large or small scale automation. As will be appreciated, with continuous evolvement of technologies, the HMI applications may require updates over time so as to implement the advancements and improvements. Further, product solutions are increasingly getting differentiated based on user experience they offer. The HMI applications have, therefore, become a key component of driving product differentiations. In order to maintain product differentiation and level of engagement of the user, the HMI applications may require periodic updates that provide new and improved experience to the user. As a result, there may be a need for developing and validating the HMI applications and their updated versions in a cost effective, efficient, and scalable manner. However, such development and validation may be challenging due to highly volatile nature of the HMI application and further due to increasing complexity of the HMI application. For example, the increasing complexity of the HMI application may put more demand on testing the HMI application. Further, for example, frequent updates in the HMI application may affect the testing of the HMI application (e.g., insufficient test coverage).

Some of the existing techniques may provide for manual testing of the HMI application, which requires skilled human experts that may maintain a consistency in performing the tests. However, such manual testing of the HMI application may be expensive, time-consuming, and not scalable. Further, some of the existing techniques may provide for model-based testing of the HMI application, which may require designing a test-oriented HMI specific model, application specific test criteria, or the like. However, such model-based testing of the HMI application may be time-consuming, thereby causing delay and affecting actual deployment time of the desired HMI application.

SUMMARY

In one embodiment, a method for developing a modular testing kit for testing a modular component of a human machine interface (HMI) application platform is disclosed. In one example, the method may include generating a plurality of test cases for testing the modular component based on a definition of each of a set of interfaces configured to implement the modular component on a target platform. The method may further include developing the modular testing kit to execute the plurality of test cases by simulating each of the set of interfaces. The method may further include creating a test script for each of the plurality of test cases using the modular testing kit.

In one embodiment, a system for developing a modular testing kit for testing a modular component of a HMI application is disclosed. In one example, the system may include at least one processor and a computer-readable medium storing instructions that, when executed by the at least one processor, may cause the at least one processor to generate a plurality of test cases for testing the modular component based on a definition of each of a set of interfaces configured to implement the modular component on a target platform. The processor-executable instructions, on execution, may further cause the processor to develop the modular testing kit to execute the plurality of test cases by simulating each of the set of interfaces. The processor-executable instructions, on execution, may further cause the processor to create a test script for each of the plurality of test cases using the modular testing kit.

In one embodiment, a non-transitory computer-readable medium storing computer-executable instructions for developing a modular testing kit for testing a modular component of a HMI application is disclosed. In one example, the stored instructions, when executed by a processor, may cause the processor to generate a plurality of test cases for testing the modular component based on a definition of each of a set of interfaces configured to implement the modular component on a target platform. The stored instructions, when executed by the processor, may further cause the processor to develop the modular testing kit to execute the plurality of test cases by simulating each of the set of interfaces. The stored instructions, when executed by the processor, may further cause the processor to create a test script for each of the plurality of test cases using the modular testing kit.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3 is a tabular representation of an exemplary business logic (BL) information organization in an exemplary BL component of the HMI application, in accordance with some embodiments of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
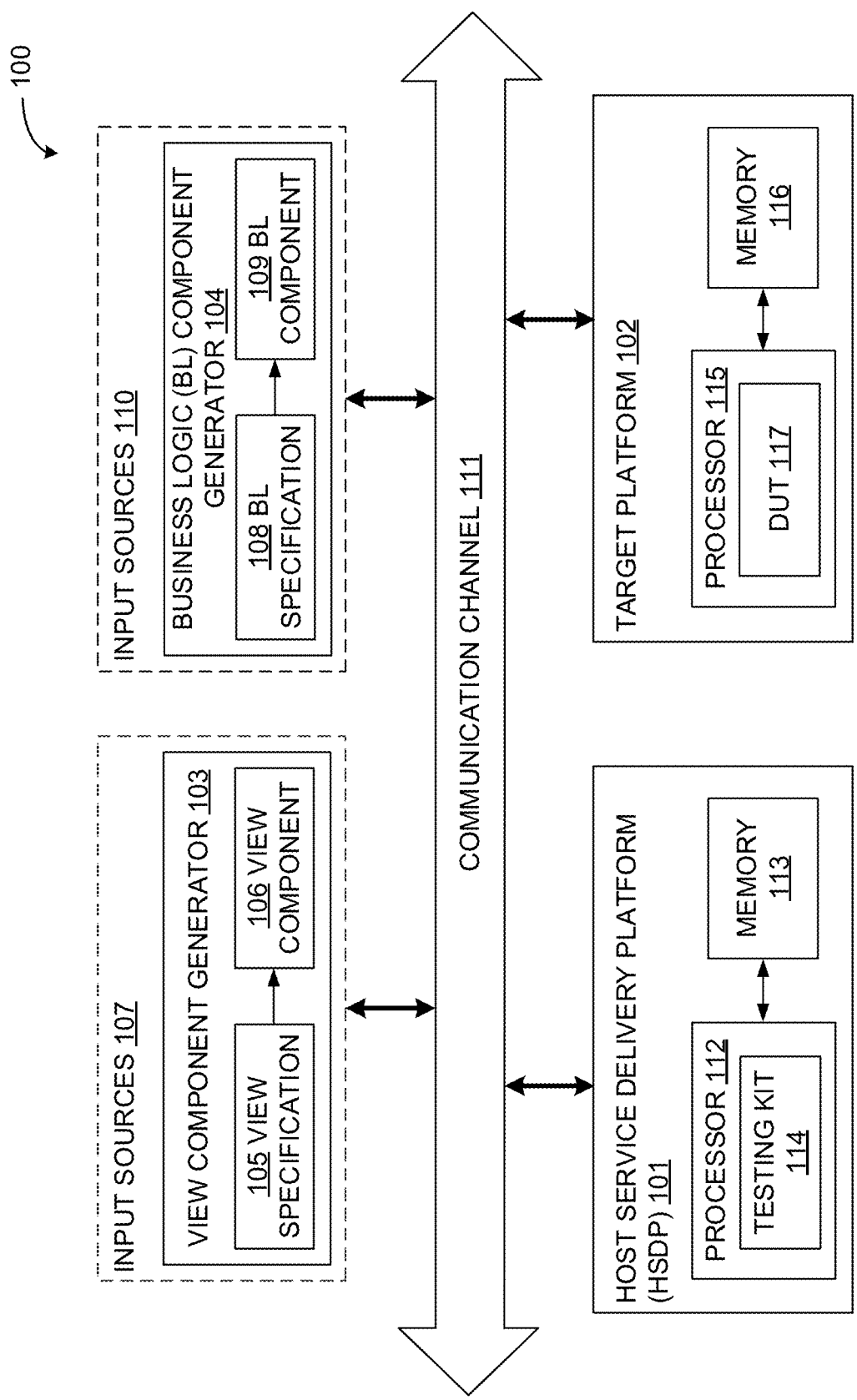
FIG. 1 is a block diagram of an exemplary system for developing and validating a human machine interface (HMI) application, in accordance with some embodiments of the present disclosure.

Referring now to FIG. 1, an exemplary system 100 for developing and validating a human machine interface (HMI) application is illustrated, in accordance with some embodiments of the present disclosure. As will be appreciated, the HMI application may be developed and validated on a host service delivery platform (HSDP) 101. The HMI application may then be delivered from the HSDP platform 101 to a target platform 102. In some embodiments, the system 100 may develop and deliver the HMI application from the HSDP platform 101 to the target platform 102 using a cloud-based service, also referred to as HMI as a Service (HaaS). Upon delivery, the HMI application may be implemented on the target platform 102. Further, upon implementation, the HMI application may be validated on the target platform.

As will be appreciated, a typical HMI application may include various components, such as, a view component, a business logic (BL) component, a platform component, and so forth. The view component may be responsible for the look and feel of the HMI application and may provide a medium for a user to interact with the HMI application. The BL component may provide for control and functioning of the HMI application. For example, the BL component may be responsible for control and navigation action within the HMI application. The platform component may provide for platform specific services of the HMI application.

It should be noted that, in some embodiments, these components may be developed, validated, delivered, and deployed as modular components decoupled from each other, in accordance with some embodiments of the present disclosure, thereby enabling faster development, validation, delivery and deployment of the HMI application in a cost effective, efficient, and scalable manner. Further, in some embodiments, the system 100 may develop and deliver the HMI application from the HSDP 101 to the target platform 102 by developing and delivering each of the modular components (that is, the view component, the BL component, and the platform component) of the HMI application using HaaS. The system may further enable validating each of the modular components of the HMI application on the HSDP platform 101 and on the target platform 102. As will be appreciated, a new paradigm of testing may be required so as to handle modularity of the application (that is, to perform testing of each of the modular components of the HMI application independent of the other modular components).

The system 100 may include the HSDP platform 101, the target platform 102, a view component generator 103, and a BL component generator 104. The view component generator 103 may receive a view specification 105 for generating a view component 106 of the HMI application. In some embodiments, the view component generator 103 may generate the view component 106 by emulating the view specification 105 into a view database. It should be noted that the view component generator 103 may receive the view specification 105 from one or more input sources 107. The view component generator 103 may further store the received view specification 105 in a memory (not shown). Further, the view component generator 103 may employ a view component generation engine (not shown) for generating the view component 106. For example, in some embodiments, the view component generator 103 may employ a view database generation engine that may emulate the view specification 105 into the view database, which may be implemented in a view database schema and stored in the memory (not shown). The generation of view component 106, for example in form of view database, by the view component generator 103 has been described in pending Indian Patent Application No. 201841005971 by the Applicant, the contents of which are incorporated herein in their entirety by reference. In some embodiments, the view component generator 103 may include a user interface (not shown) that allow user to create and preview the view prior to submitting the view specification 105 to the view component generation engine (not shown) for creating the view component 106.

Figure 2:
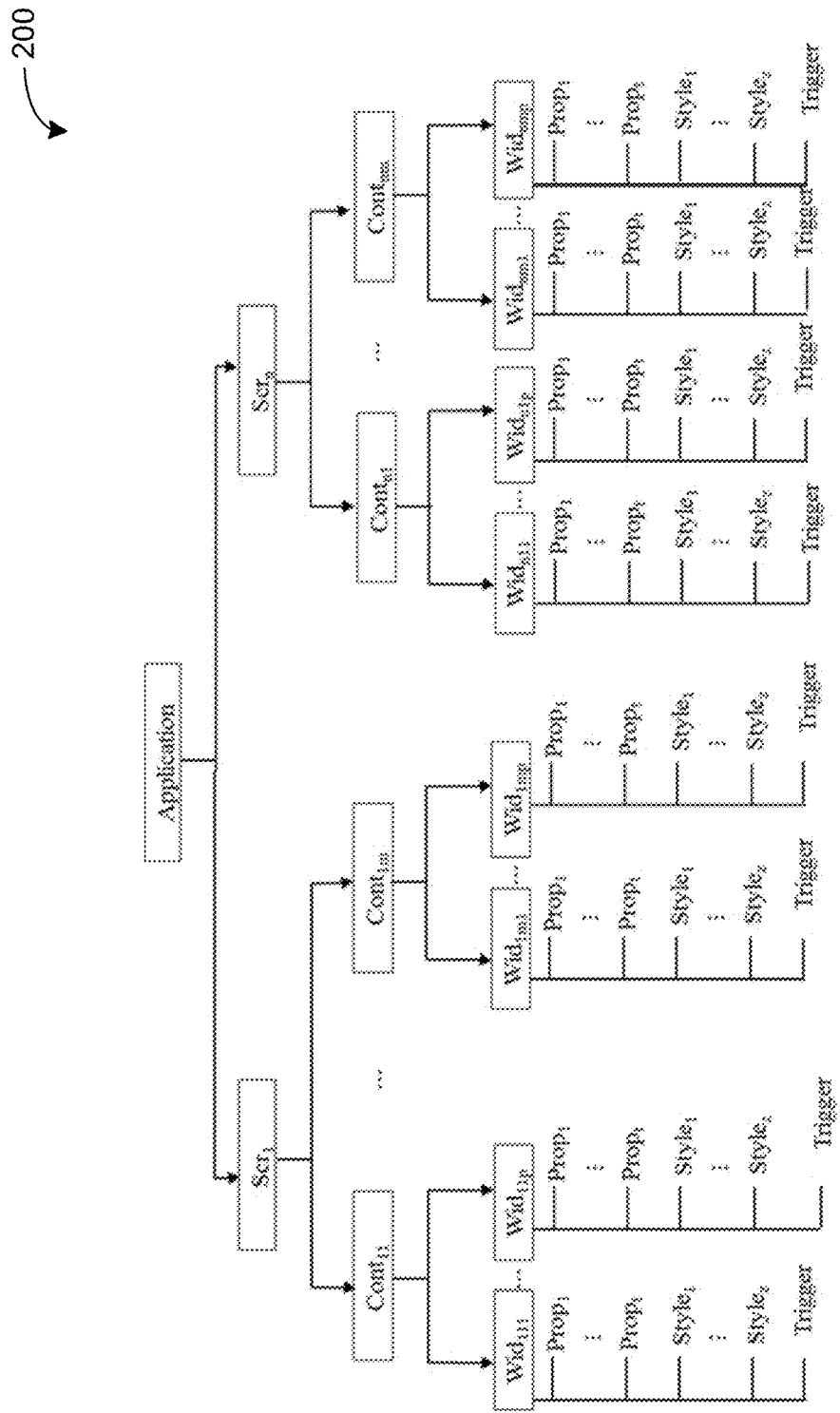
FIG. 2 is a schematic representation of an exemplary view information organization in an exemplary view component of the HMI application, in accordance with some embodiments of the present disclosure.

The view component 106 may include a view information, an image information, and a string information. The view information may include information of all view elements of the HMI application. The image information may include a list of images used in the HMI application, while the string information may include a list of strings used in the HMI application. As will be appreciated, for each view, the image of the screen may be stored. Referring now to FIG. 2, a schematic representation of an exemplary view information organization 200 in the view component 106 is illustrated, in accordance with some embodiments of the present disclosure. In particular, the view information 200 of the HMI application may include multiple screens (Scr), such as Scr1, Scr2, . . . Scri (Scri representing the ith screen). Additionally, each of the screens may include multiple panels or containers (Cont), such as Contij (Contij representing the jth container of the ith screen). Further, each of the containers may include multiple widgets (Wid), such as Widijk (Widijk representing kth widget of jth container of ith screen). The widgets may include, but are not limited to, text box and button. It should be noted that each widget may have multiple properties (e.g., (x, y) coordinates, style attributes (e.g., font, color, bold, italics, etc), and so forth. Each widget may also be associated with a trigger that may be initiated for prompting and receiving user inputs in that widget. This trigger may then be passed to the BL component for further processing. Further, it should be noted that the container may include a child container. Additionally, the view component 106 may also include a view image that may be employed for test automation purpose. Further, the view component 106 may provide for the query information interface to obtain details of any screen elements. As will be appreciated, the view component 106 may use the query interface to obtain the information and render the screen.

Referring back to FIG. 1, the BL component generator 104 may receive a BL specification 108 for generating a BL component 109 of the HMI application. As mentioned above, the BL component generator 104 may receive the BL specification 108 from one or more input sources 110 and store the same in a memory (not shown). Further, the BL component generator 104 may employ a BL component generation engine (not shown) for generating the BL component 109 from the BL specification 108. In some embodiments, the BL component 109 may be generated by emulating the BL specification 108 into a BL database. In such embodiments, the BL component generator 104 may employ a BL database generation engine so as to emulate the BL specification 108 into the BL database, which may be implemented in a BL database schema and stored in the memory (not shown). The generation of BL component 109, for example in form of BL database, by the BL component generator 104 has been described in pending Indian Patent Application No. 201841005780 by the Applicant, the contents of which are incorporated herein in their entirety by reference. It should be noted that, in some embodiments, the original equipment manufacturer (OEM) may provide the BL specification 108 to the BL component generator 104 in a paper format. Further, in some embodiments, the BL database generator 104 may include a modeling tool (not shown) for modeling the BL specification 108 to be implemented on the target platform 102.

Referring now to FIG. 3, a tabular representation of an exemplary BL information organization 300 in the BL component 109 is illustrated, in accordance with some embodiments of the present disclosure. The BL component 109 may include a set of states. Each of the states may further include various functions, such as 'Entry' function, 'Do' function, 'Exit' function, and 'Transition' function. The 'Entry' function may be executed during a transition from other state to a current state. The 'Do' function may be executed for doing any continuous processing that may be needed for the current state. The 'Exit' function may be executed during a transition to other state from the current state. Typically, while moving from 'state A' to 'state B', 'Exit' function of 'state A' and 'Entry' function of 'state B' may be called for performing finalization and initialization activities. The 'Do' function may be used for performing state specific processing. The 'Transition' function may include additional details for each of the triggers. For example, for each trigger, the 'Transition' function may include a 'Guard' condition, an 'Action' function, and a 'Next' state. The 'Guard' condition may relate to a condition that may be evaluated before taking a particular action. The Action function may relate to a function that may be executed upon fulfillment of the 'Guard' condition. The 'Next' state may relate to a name of the next state upon completion of the 'Action' function.

Referring back to FIG. 1, the HSDP 101 may be communicatively coupled to the view component generator 103 and the BL component generator 104 via a communication channel 111. The HSDP 101 may further be communicatively coupled to the target platform 102 via the communication channel 111. The communication channel may be any wired or wireless communication network (e.g., local area network (LAN), wireless LAN (WLAN), wide area network (WAN), Internet, etc.) or a wired or wireless communication medium (e.g., serial port, universal serial bus (USB), Bluetooth, etc.). In some embodiments, the HSDP 101 may receive the view component 106 from the view component generator 103 and the BL component 109 from the BL component generator 104. The HSDP 101 may then validate each of these modular components (that is, the view component 106 and the BL component 109). Additionally, the HSDP may develop and validate the platform component of the HMI application. Further, the HSDP 101 may deliver the HMI application to the target platform 102 by delivering the modular components (that is, the view component 106, the BL component 109, and the platform component). The HSDP 101 may also validate each of the modular components (that is, the view component 106, the BL component 110, and the platform component) of the HMI application deployed on the target platform 102. Thus, the HSDP 101 may act as a cloud service platform for delivering the modular components of the HMI application to the target platform 102 and for validating the modular components of the HMI application on the target platform 102.

It should be noted that, in some embodiments, the view component generator 103 and the BL component generator 104 may be implemented within the HSDP 101. Thus, the HSDP 101 may generate the view component 106 (using the view component generation engine) and the BL component (using the BL component generation engine) from the view specification and the BL specification, respectively. In such embodiments, the system 100 may include the HSDP 101 and the target platform 102.

The HSDP 101 may include a processor 112 and a memory 113 for implementing the HMI service for delivering the HMI application to the target platform 102, as well as for implementing the HMI testing framework for testing the HMI application. In particular, as will be described in greater detail in conjunction with FIGS. 5-7, the HSDP 101 may provide for modular testing kits 114 for performing automated testing of corresponding modular components of the HMI application, in accordance with some embodiments of the present disclosure. Additionally, the HSDP 101 may provide for testing framework, also referred to as HMI test automation framework (HTAF), for testing the HMI application deployed on the target platform. It should be noted that the modular testing kits 114 may perform white box testing (that is, testing internal structure or working of each line) of the corresponding modular components of the HMI application, while the HTAF may perform black box testing (that is, testing overall functionality) of each of the modular components of the HMI application.

The target platform 102 may receive the HMI application and any validation scripts from the HSDP 101 over the communication network 111. The target platform 102 may include a processor 115 and a memory 116. The processor may further include a device under test (DUT) component 117. As will be described in greater detail in conjunction to FIG. 4, the DUT 117 may provide for a scalable architecture by way of loosely coupled view component, BL component, platform component.

Figure 4:
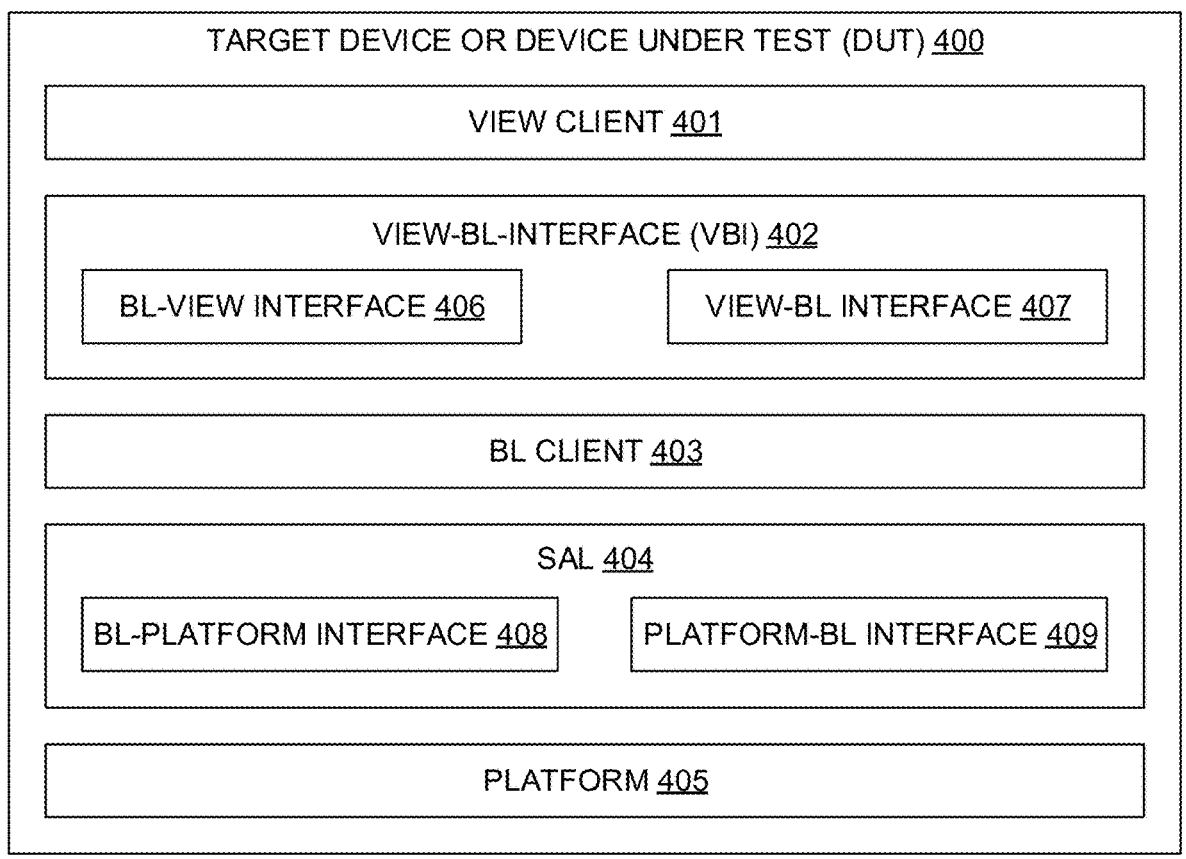
FIG. 4 is a functional block diagram of a target device, in accordance with some embodiments of the present disclosure.

Referring now to FIG. 4, a functional block diagram of an exemplary DUT 400, analogous to the DUT 117 of FIG. 1, is illustrated in accordance with some embodiments of the present disclosure. The DUT may also be referred to as target device or target platform and may be used interchangeably throughout the document. The DUT 400 may include a view client 401, a View-BL-Interface (VBI) 402, a BL client 403, a service access layer (SAL) 404, and a platform 405. The view client 401 may be a thin client for visualizing the HMI application screen based on the view component. The BL client 403 may be a thin client for executing control logic, based on the BL component, for control and functioning of the HMI application. The VBI 402 may be an interface between the view client 401 and the BL client 403, and may be defined using an XML schema.

Further, the VBI 402 may decouple the view client 401 from the BL client 403. In some embodiments, the VBI 402 may further include a BL-view interface 406 and a view-BL interface 407. As will be appreciated, the BL-view interface 406 may act as a BL command processor and may translate inputs from the BL client 403 for the view client 401. Similarly, the view-BL interface 407 may act as a view command processor and may translate inputs from the view client 401 for the BL client 403. Thus, for example, the user interface (UI) input received by the view client 401 may be communicated to the BL client 403 via the view-BL interface 407. Further, the view client 401 may receive the input from the BL client 403 via the BL-view interface 406.

The platform 405 may include platform specific services encapsulated in a platform layer. As will be appreciated, the platform services may be executed based on the platform component. The SAL 404 may be an interface that may decouple the BL client 403 from the platform 405. It should be noted that the SAL 404 may use an XML based schema to define the interface between the BL client 403 and the platform 405. In some embodiments, the SAL 404 may further include a BL-platform interface 408 and a platform-BL interface 409. As will be appreciated, the BL-platform interface 408 may act as a BL command processor and may translate inputs from the BL client 403 for the platform 405. Similarly, the platform-BL interface 409 may act as a platform command processor and may translate inputs from the platform 405 for the BL client 403.

It should be noted that, in some embodiments, the DUT 400 may also include a database (not shown) that may further include the view component, the BL component, and the platform component received from the HSDP platform and installed on the DUT 400. In some embodiments, the database may further include a query interface to execute queries from the view client 401 and the BL client 403 against the respective view component (for example, view database) and the BL component (for example, BL database). Moreover, the database may include a device synchronization interface (DSI) that may enable the target platform to synchronize the view component and the BL component with any updates that may be available from the HSDP 101.

It should be noted that the above discussed subsystems (HSDP platform 101, target platform 102, view component generator 103, BL component generator 104, DUT 119, 400, etc.) and their modules, circuitry, etc. may be implemented in programmable hardware devices such as programmable gate arrays, programmable array logic, programmable logic devices, and so forth. Alternatively, the subsystems, circuitry, and modules may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code may be a single instruction, or many instructions, and may even be distributed over several different code segments, among different applications, and across several memory devices.

Figure 5:
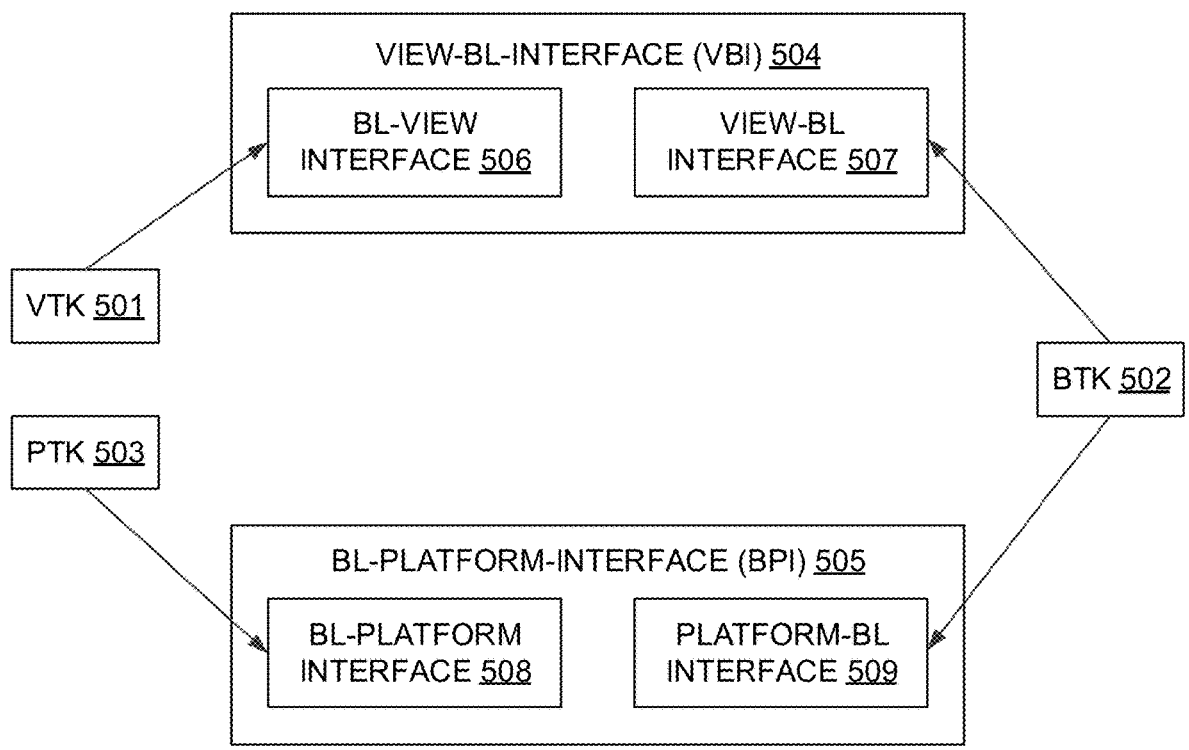
FIG. 5 is a schematic for developing exemplary modular testing kits for corresponding modular components of the HMI application, in accordance with some embodiments of the present disclosure.

Referring now to FIG. 5, a schematic for developing exemplary modular testing kits for corresponding modular components of the HMI application by the HSDP 101 is illustrated, in accordance with some embodiments of the present disclosure. As will be appreciated, in some embodiments, the modular testing kits may include a view testing kit (VTK) 501 for the view component, a BL testing kit (BTK) 502 for the BL component, and a platform testing kit (PTK) 503 for the platform component. As will be appreciated, these modular testing kits may facilitate testing of corresponding modular components of the HMI application without the need for the other modular components. For example, VTK 501 may test the view component of the HMI application even when the BL component is not available by simulating the necessary logic provided by the BL component. In other words, the VTK 501 may respond to the inputs from the view component in a substantially similar fashion as the BL component would respond.

The HSDP 101 may first create a view-BL-interface (VBI) 504 and a BL-platform-interface (BPI) 505 based on the definition each of the interfaces. As will be appreciated, the VBI 501 may further include a BL-view interface 506 and a view-BL interface 507. Similarly, the BPI 505 may further include a BL-platform interface 508 and a platform-BL interface 509. The HSDP 101 may then develop various modular testing kits corresponding to the various modular components using the VBI interface 504 and the BPI interface 505. In particular, the HSDP 101 may develop a modular testing kit for a corresponding modular component by simulating one or more interfaces necessary for implementation of that modular component. For example, the HSDP 101 may develop the VTK 501 for simulating the BL-view interface 506 (that is, simulating necessary logic provided by the BL component) so as to test view component of the HMI application. Additionally, the HSDP 501 may develop the BTK 502 for simulating view-BL interface 507 (that is, simulating necessary logic provided by the view component) for user input simulation and platform-BL interface 509 (that is, simulating necessary logic provided by the platform) for platform input simulation so as to test BL component of the HMI application. Further, the HSDP 501 may develop the PTK 503 for simulating the BL-platform interface 508 (that is, simulating necessary logic provided by the BL component) so as to test platform component needed for the application.

The HSDP 101 may generate a number of test cases for testing a modular component based on a definition of each of a set of interfaces configured to implement the modular component on the target platform. In some embodiments, the test cases may be generated by analyzing each of the set of interfaces to determine input/output (I/O) parameters and their respective ranges. Further, in some embodiments, an optimal number of test cases may be generated using an orthogonal array. The HSDP 101 may then develop a modular testing kit, also referred to as modular testing application, so as to execute the plurality of test cases by simulating each of the set of interfaces. It should be noted that, in some embodiments, an interface may be simulated by simulating commands corresponding to the modular component that may be dependent on other modular components. The HSDP 101 may then create a test script for each of the test cases using the modular testing kit.

By way of example, in some embodiments, a test case for the view component may be developed based on the interface defined in interface design stage. The test case may be one or more combinations from the interface definition using an orthogonal array, thereby ensuring an optimum number of test cases. Further, the view testing kit 501 may be developed so as to execute the test case by simulating necessary view command as specified in specification. It should be noted that each test case may be verified against a reference image of the screen. For example, in some embodiments, the reference image may be obtained using the information from SceneImg Table that may be created based on the view database schema. Further, while testing, information for logs may be captured at the VBI layer so as to verify if the view component successfully passes appropriate command to the BL component.

By way of another example, in some embodiments, a test case for the BL component may be developed based on the interface defined in interface design stage. As stated above, the test case may be one or more combinations from the interface definition using an orthogonal array, thereby ensuring an optimum number of test cases. Further, the BL testing kit 502 may be developed so as to execute the test case by simulating necessary view driven triggers and system initiated triggers as specified in specification. Further, while testing, information for logs may be captured at the VBI layer and the SAL layer so as to verify expected BL component behavior.

By way of yet another example, in some embodiments, a test case for the platform component may be developed based on the interface defined in interface design stage. Again, as stated above, the test case may be one or more combinations from the interface definition using an orthogonal array, thereby ensuring an optimum number of test cases. Further, the platform testing kit 503 may be developed so as to execute the test case by simulating necessary platform actions as specified in specification. Further, while testing, information for logs may be captured at the SAL layer so as to verify expected platform component behavior.

As will be appreciated by one skilled in the art, a variety of processes may be employed for developing a modular testing kit for testing a modular component of the HMI application. For example, the exemplary system 100 may provide for development of the modular testing kit by the processes discussed herein. In particular, as will be appreciated by those of ordinary skill in the art, control logic and/or automated routines for performing the techniques and steps described herein may be implemented by the system 100, either by hardware, software, or combinations of hardware and software. For example, suitable code may be accessed and executed by the one or more processors on the HSDP 101 to perform some or all of the techniques described herein. Similarly application specific integrated circuits (ASICs) configured to perform some or all of the processes described herein may be included in the one or more processors on the HSDP 101.

Figure 6:
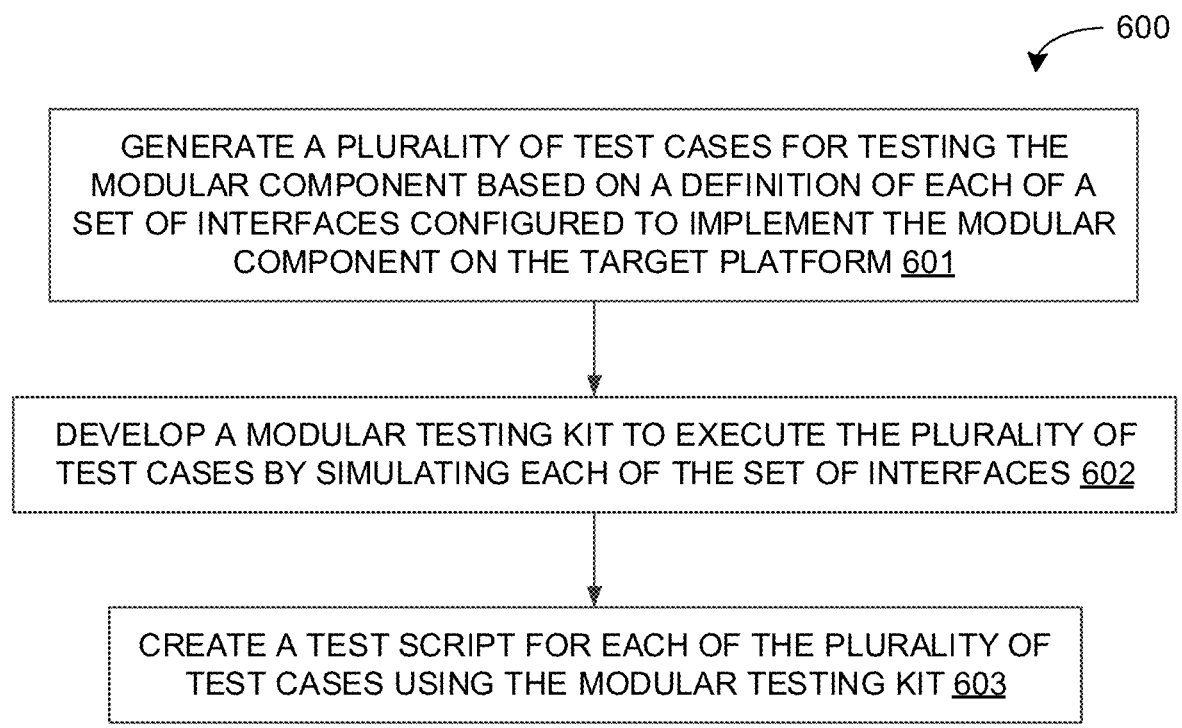
FIG. 6 is a flow diagram of an exemplary process for developing a modular testing kit for testing a modular component of the HMI application, in accordance with some embodiments of the present disclosure.

For example, referring now to FIG. 6, exemplary control logic 600 for developing a modular testing kit for testing a modular component of a HMI application in a system, such as the system 100, is depicted via a flowchart in accordance with some embodiments of the present disclosure. As illustrated in the flowchart, the control logic 600 may include the steps of generating a plurality of test cases, for testing the modular component, based on a definition of each of a set of interfaces configured to implement the modular component on a target platform at step 601, developing the modular testing kit to execute the plurality of test cases by simulating each of the set of interfaces at step 602, and creating a test script for each of the plurality of test cases using the modular testing kit at step 603.

In some embodiments, generating the plurality of test cases at step 601 may further include the steps of analyzing each of the set of interfaces to determine a plurality of I/O parameters, and generating the plurality of test cases based on a range of each of the plurality of I/O parameters. Additionally, in some embodiments, generating the plurality of test cases at step 601 may include the step of generating an optimized number of test cases from the definition of each of the set of interfaces using an orthogonal array. Further, in some embodiments, simulating each of the set of interfaces at step 602 may include the step of simulating one or more commands corresponding to the modular component that are dependent on one or more other modular components.

In some embodiments, the modular component may include a view component of the HMI application. In such embodiments, the set of interfaces may include a BL-view interface. Additionally, in such embodiments, the modular testing kit may include a view testing kit (VTK) configured to simulate the BL-view interface for testing the view component. Further, in such embodiments, the VTK may be configured to simulate one or more view commands specified in the definition of the BL-view interface, and to verify whether the view component passes the one or more view commands to a BL component.

In some embodiments, the modular component may include a BL component of the HMI application. In such embodiments, the set of interfaces may include a view-BL interface and a platform-BL interface. Additionally, in such embodiments, the modular testing kit may include a BL testing kit (BTK) configured to simulate the view-BL interface for user input simulation and the platform-BL interface for platform input simulation for testing the BL component. Further, in such embodiments, the BTK may be configured to simulate one or more view driven triggers specified in the definition of the view-BL interface and one or more system initiated triggers specified in the definition of the platform-BL interface, and to verify whether the BL component performs as expected.

In some embodiments, the modular component may include a platform component needed for the HMI application. In such embodiments, the set of interfaces may include a BL-platform interface. Additionally, in such embodiments, the modular testing kit may include a platform testing kit (PTK) configured to simulate the BL-platform interface for testing the platform component. Further, in such embodiments, the PTK may be configured to simulate one or more platform actions specified in the definition of the BL-platform interface, and to verify whether the platform component performs as expected.

Figure 7:
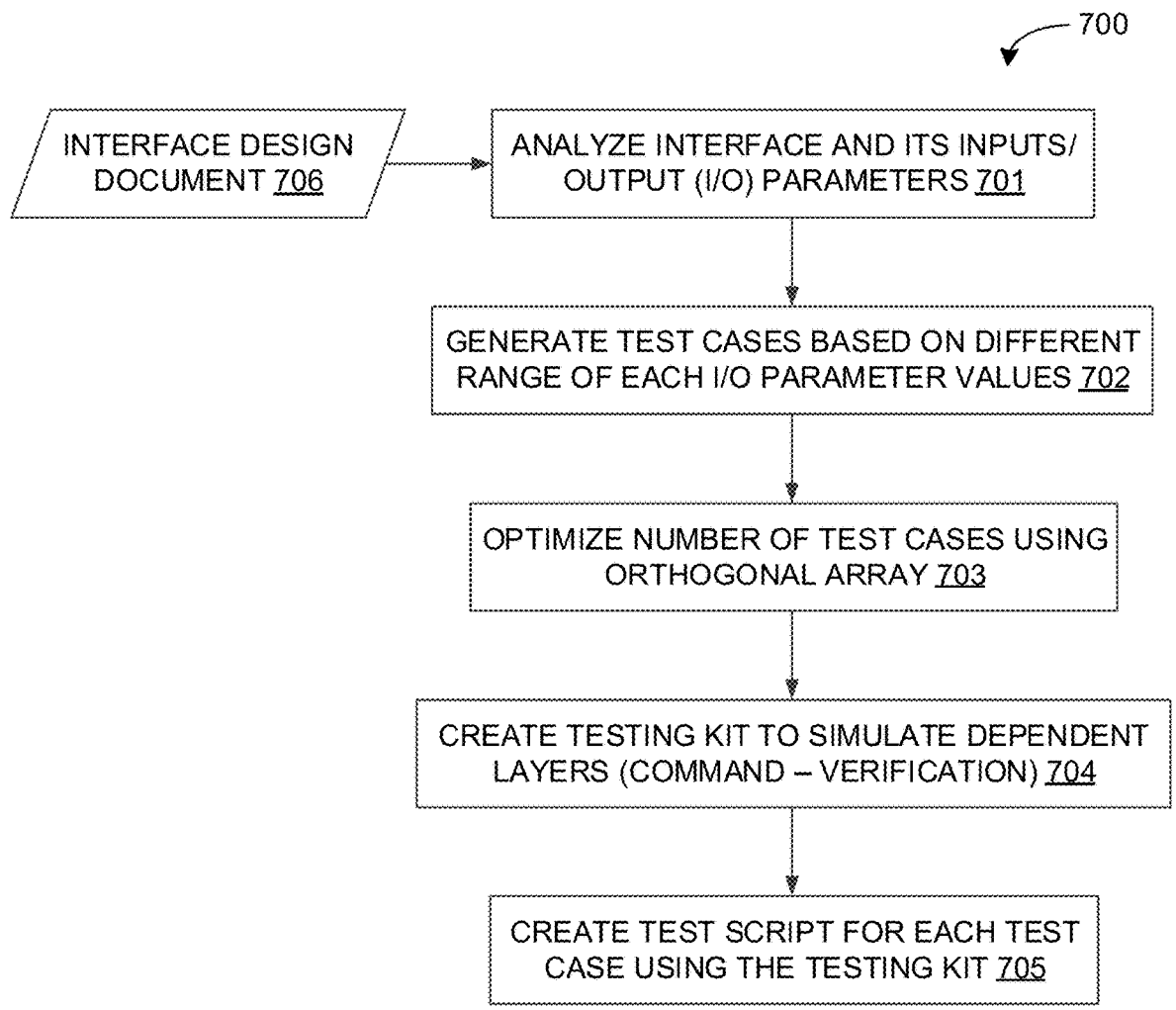
FIG. 7 is a flow diagram of a detailed exemplary process for developing a modular testing kit for testing a modular component of the HMI application, in accordance with some embodiments of the present disclosure.

Referring now to FIG. 7, exemplary control logic 700 for developing a modular testing kit for testing a modular component of a HMI application is depicted in greater detail via a flowchart, in accordance with some embodiments of the present disclosure. As illustrated in the flowchart, at step 701, the control logic 700 may receive an interface design document 706, and analyze a set of interfaces defined in the interface design document 706 so as to determine their I/O parameters. At step 702, the control logic 700 may generate a number of test cases for testing the modular component based on a range of value for each of the I/O parameters. Further, at step 703, the control logic 700 may determine an optimal number of test cases using an orthogonal array.

At step 704, the control logic 700 may develop a modular testing kit so as to execute the plurality of test cases. As discussed above, the modular testing kit may be developed so as to simulate each of the set of interfaces that may be necessary to implement the modular component. In other words, the modular testing kit may be developed to simulate the dependent layers of the modular component such that any command corresponding to the modular component may be executed independent of any other modular components. Further, at step 705, the control logic 700 may create a test script for each of the test cases using the modular testing kit.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific control logics.

Figure 8:
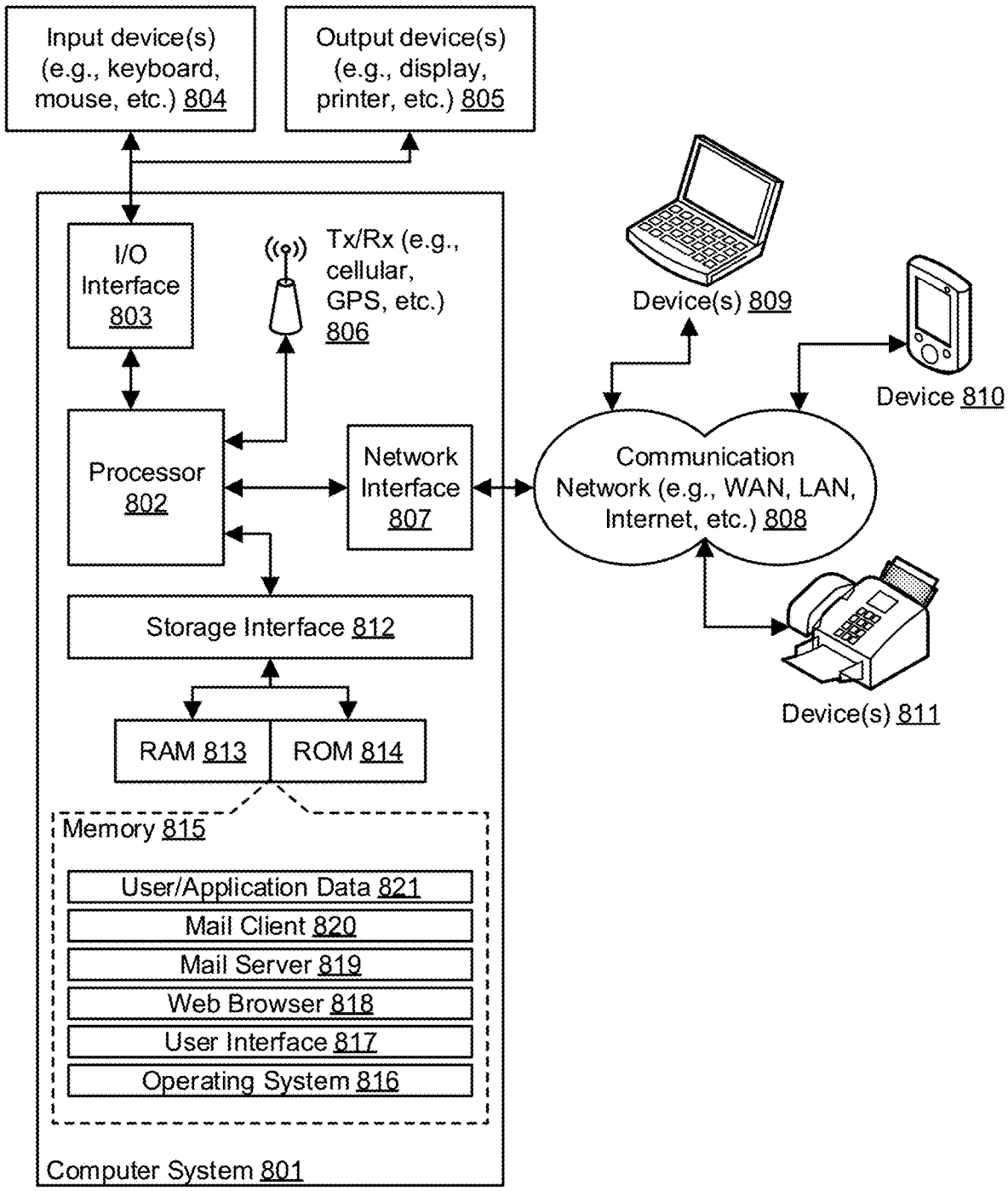
FIG. 8 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 8, a block diagram of an exemplary computer system 801 for implementing embodiments consistent with the present disclosure is illustrated. Variations of computer system 801 may be used for implementing system 100, HSDP 101, target platform 102, view component generator 103, and BL component generator 104 for developing and validating the HMI application. Computer system 801 may include a central processing unit ("CPU" or "processor") 802. Processor 802 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 802 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 802 may be disposed in communication with one or more input/output (I/O) devices via I/O interface 803. The I/O interface 803 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), RF antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 803, the computer system 801 may communicate with one or more I/O devices. For example, the input device 804 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 805 may be a printer, fax machine, video display (e.g., cathode ray tube (CRT), liquid crystal display (LCD), light-emitting diode (LED), plasma, or the like), audio speaker, etc. In some embodiments, a transceiver 806 may be disposed in connection with the processor 802. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 802 may be disposed in communication with a communication network 808 via a network interface 807. The network interface 807 may communicate with the communication network 808. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 808 may include, without limitation, a direct interconnection, local area network (LAN), wide area network (WAN), wireless network (e.g., using Wireless Application Protocol), the Internet, etc. Using the network interface 807 and the communication network 808, the computer system 801 may communicate with devices 809, 810, and 811. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 801 may itself embody one or more of these devices.

In some embodiments, the processor 802 may be disposed in communication with one or more memory devices (e.g., RAM 813, ROM 814, etc.) via a storage interface 812. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 816, user interface application 817, web browser 818, mail server 819, mail client 820, user/application data 821 (e.g., any data variables or data records discussed in this disclosure), etc.

The operating system 816 may facilitate resource management and operation of the computer system 801.

Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 817 may facilitate display, execution, interaction, manipulation, or operation of program components through textual or graphical facilities. For example, user interfaces may provide computer interaction interface elements on a display system operatively connected to the computer system 801, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 801 may implement a web browser 818 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 801 may implement a mail server 819 stored program component. The mail server may be an Internet mail server such as Microsoft Exchange, or the like. The mail server may utilize facilities such as ASP, ActiveX, ANSI C++/C #, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 801 may implement a mail client 820 stored program component. The mail client may be a mail viewing application, such as Apple Mail, Microsoft Entourage, Microsoft Outlook, Mozilla Thunderbird, etc.

In some embodiments, computer system 801 may store user/application data 821, such as the data, variables, records, etc. (e.g., view specification, BL specification, view component, BL components, interface design document, test cases, test scripts, modular testing kits, I/O parameters of each interfaces, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for HMI test automation framework (HTAF) that may aid in rapid development and validation (that is, testing) of the HMI application in a cost effective, efficient, and scalable manner. In particular, the techniques provide for modular testing kit for testing modular components of the HMI application independent of each other. For example, the techniques provide for a means of building a platform independent, easily configurable, HMI testing framework in an automated manner by leveraging view and BL modeling done and maintained as databases. It should be noted that any changes in view and BL component may be easily incorporated in the test automation framework. Additionally, the techniques provide for maximum testing coverage. Further, the techniques do not entail performing comparisons with reference prototypes.

Further, the techniques provide for a test automation that can perform validation based on the specific target application. In other words, unit test kit for view, BL, and platform component of the HMI application may be created for simulation and test of the view, BL and platform component for the specific HMI application. Moreover, the techniques provide for a unique deployment architecture to leverage the modular components of the HMI application modeled as databases (that is, view database and BL database) to automate the testing of the HMI application. As will be appreciated, since the view logic and the business logic are modeled as databases, the test cases and corresponding scripts may be generated automatically.

The specification has described method and system for developing and validating the HMI application. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of developing a modular testing kit for testing a modular component of a human machine interface (HMI) application, the method comprising:

generating, by a host service delivery platform (HSDP), a plurality of test cases for testing the modular component based on a definition of each of a set of interfaces configured to implement the modular component on a target platform, wherein the modular component comprises one of a view component, a Business Logic component (BL component), and a platform component, wherein a view-BL-interface (VBI) and a BL-platform-interface (BPI) is created based on the definition of each of a set of interfaces;

developing, by the HSDP, the modular testing kit using the VBI interface and the BPI interface to execute the plurality of test cases by simulating each of the set of interfaces, wherein simulating each of the set of interfaces comprises simulating one or more commands corresponding to the modular component that are dependent on one or more other modular components, wherein the VBI interface further comprises a BL-view interface and a view-BL interface and the BPI interface further comprises a BL-platform interface and a platform-BL interface;

developing, by the HSDP, a HMI test automation framework (HTAF), for testing the HMI application deployed on the target platform; and creating, by the HSDP, a test script for each of the plurality of test cases using the modular testing kit and the HMI test automation framework, wherein the modular testing kit perform a white box testing of the corresponding modular components of the HMI application, and the HTAF perform black box testing of each of the modular components of the HMI application.

2. The method of claim 1, wherein generating the plurality of test cases comprises:
analyzing each of the set of interfaces to determine a plurality of input/output (I/O) parameters; and
generating the plurality of test cases based on a range of each of the plurality of I/O parameters.

3. The method of claim 1, wherein generating the plurality of test cases comprises generating an optimized number of test cases from the definition of each of the set of interfaces using an orthogonal array.

4. The method of claim 1, wherein the modular component comprises the view component of the HMI application, wherein the set of interfaces comprises the business logic (BL) view interface, and wherein the modular testing kit comprises a view testing kit (VTK) configured to simulate the BL-view interface for testing the view component.

5. The method of claim 4, wherein the VTK is configured to simulate one or more view commands specified in the definition of the BL-view interface, and to verify whether the view component passes the one or more view commands to the BL component.

6. The method of claim 1, wherein the modular component comprises the BL component of the HMI application, wherein the set of interfaces comprises the view-BL interface and the platform-BL interface, and wherein the modular testing kit comprises a BL testing kit (BTK) configured to simulate the view-BL interface for user input simulation and the platform-BL interface for platform input simulation for testing the BL component.

7. The method of claim 6, wherein the BTK is configured to simulate one or more view driven triggers specified in the definition of the view-BL interface and one or more system initiated triggers specified in the definition of the platform-BL interface, and to verify whether the BL component performs as expected.

8. The method of claim 1, wherein the modular component comprises the platform component needed for the HMI application, wherein the set of interfaces comprises the business logic (BL)-platform interface, and wherein the modular testing kit comprises a platform testing kit (PTK) configured to simulate the BL-platform interface for testing the platform component.

9. The method of claim 8, wherein the PTK is configured to simulate one or more platform actions specified in the definition of the BL-platform interface, and to verify whether the platform component performs as expected.

10. A system for developing a modular testing kit for testing a modular component of a human machine interface (HMI) application, the system comprising:
a host service delivery platform (HSDP) comprising at least one processor and a computer-readable medium storing instructions that, when executed by the at least one processor, cause the at least one processor to perform operations comprising:
generating a plurality of test cases for testing the modular component based on a definition of each of a set of interfaces configured to implement the modular component on a target platform, wherein the modular component comprises one of a view component, a Business Logic component (BL component), and a platform component, wherein a view-BL-interface (VBI) and a BL-platform-interface (BPI) is created based on the definition of each of a set of interfaces;
developing the modular testing kit using the VBI interface and the BPI interface to execute the plurality of test cases by simulating each of the set of interfaces, wherein simulating each of the set of interfaces comprises simulating one or more commands corresponding to the modular component that are dependent on one or more other modular components wherein the VBI interface further comprises a BL-view interface and a view-BL interface and the BPI interface further comprises a BL-platform interface and a platform-BL interface;
developing a HMI test automation framework (HTAF), for testing the HMI application deployed on the target platform; and
creating a test script for each of the plurality of test cases using the modular testing kit and the HMI test automation framework, wherein the modular testing kit perform a white box testing of the corresponding modular components of the HMI application, and the HTAF perform black box testing of each of the modular components of the HMI application.

11. The system of claim 10, wherein generating the plurality of test cases comprises:
analyzing each of the set of interfaces to determine a plurality of input/output (I/O) parameters; and
generating the plurality of test cases based on a range of each of the plurality of I/O parameters.

12. The system of claim 10, wherein the modular component comprises the view component of the HMI application, wherein the set of interfaces comprises the business logic (BL)-view interface, and wherein the modular testing kit comprises a view testing kit (VTK) configured to simulate the BL-view interface for testing the view component.

13. The system of claim 12, wherein the VTK is configured to simulate one or more view commands specified in the definition of the BL-view interface, and to verify whether the view component passes the one or more view commands to the BL component.

14. The system of claim 10, wherein the modular component comprises the BL component of the HMI application, wherein the set of interfaces comprises the view-BL interface and the platform-BL interface, and wherein the modular testing kit comprises a BL testing kit (BTK) configured to simulate the view-BL interface for user input simulation and the platform-BL interface for platform input simulation for testing the BL component.

15. The system of claim 14, wherein the BTK is configured to simulate one or more view driven triggers specified in the definition of the view-BL interface and one or more system initiated triggers specified in the definition of the platform-BL interface, and to verify whether the BL component performs as expected.

16. The system of claim 10, wherein the modular component comprises the platform component needed for the HMI application, wherein the set of interfaces comprises the business logic (BL)-platform interface, and wherein the modular testing kit comprises a platform testing kit (PTK) configured to simulate the BL-platform interface for testing the platform component.

17. The system of claim 16, wherein the PTK is configured to simulate one or more platform actions specified in the definition of the BL-platform interface, and to verify whether the platform component performs as expected.

18. A non-transitory computer-readable medium storing computer-executable instructions for:
   generating a plurality of test cases for testing a modular component of a human machine interface (HMI) application, based on a definition of each of a set of interfaces configured to implement the modular component on a target platform, wherein the modular component comprises one of a view component, a Business Logic component (BL component), and a platform component, wherein a view-BL-interface (VBI) and a BL-platform-interface (BPI) is created based on the definition of each of a set of interfaces;
   developing a modular testing kit using the VBI interface and the BPI interface to execute the plurality of test cases by simulating each of the set of interfaces, wherein simulating each of the set of interfaces comprises simulating one or more commands corresponding to the modular component that are dependent on one or more other modular components, wherein the VBI interface further comprises a BL-view interface and a view-BL interface and the BPI interface further comprises a BL-platform interface and a platform-BL interface; and
   developing a HMI test automation framework (HTAF), for testing the HMI application deployed on the target platform; and
   creating a test script for each of the plurality of test cases using the modular testing kit and the HMI test automation framework, wherein the modular testing kit perform a white box testing of the corresponding modular components of the HMI application, and the HTAF perform black box testing of each of the modular components of the HMI application.

* * * * *